UNITED STATES PATENT OFFICE.

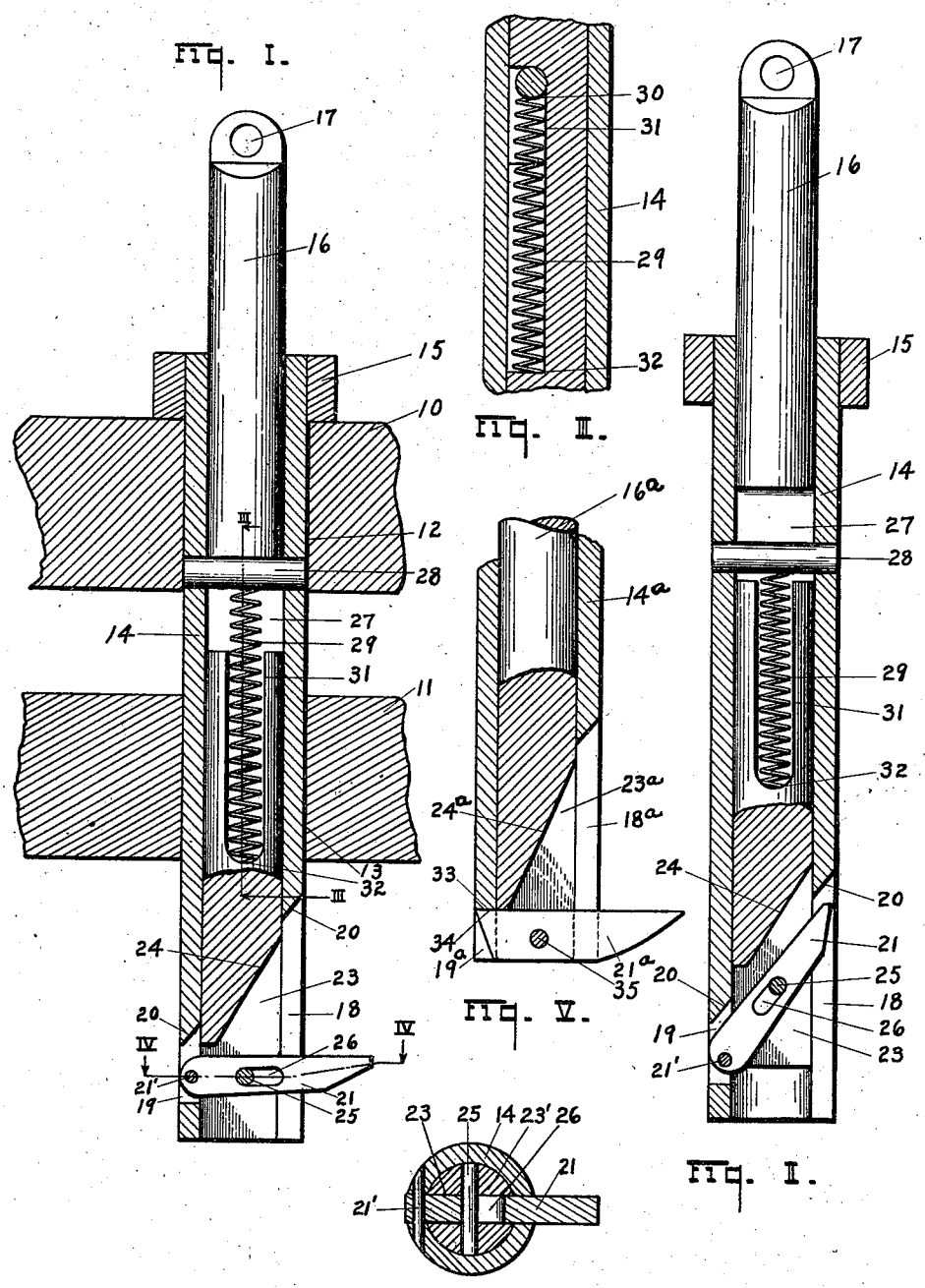

ALBERT EGBERT AND EDWARD HOLMES, OF TOLEDO, OHIO.

KINGBOLT.

1,421,768.  Specification of Letters Patent.  Patented July 4, 1922.

Application filed December 19, 1918. Serial No. 267,528.

*To all whom it may concern:*

Be it known that we, ALBERT EGBERT and EDWARD HOLMES, citizens of the United States, residing at Toledo, county of Lucas, and State of Ohio, have invented certain new and useful Improvements in Kingbolts, of which we declare the following to be a full, clear, and exact description.

Our invention relates to improvements in king-bolts, and more particularly to bolts of this character which are adapted to be provided with a detent at one end thereof for the purpose of preventing the accidental removal of the bolt, or the separation of the plates designed to be held in proper operative position thereby.

One object of our invention is to provide an improved bolt of the character described.

Another object of our invention is to provide an improved bolt of the character described, which will securely retain two operative members in proper operative relation with respect to each other, and which may be readily removed from the members.

Another object of our invention is to provide an improved bolt of the character described, provided with a detent, and having readily accessible means for withdrawing the detent from its operative position.

Further objects of this invention relate to economies of manufacture and details of construction as will hereinafter appear from the detailed description to follow. We accomplish the objects of our invention in one instance by the devices and means described in the following specification, but it is evident that the same may be varied widely without departing from the scope of the invention, as pointed out in the appended claims.

A structure constituting one embodiment of our invention, which may be the preferred, is illustrated in the accompanying drawing, forming a part thereof, in which:

Figure I is a vertical sectional view of our improved bolt with the detent shown in extended position, and showing the position of the bolt with respect to two plates which are adapted to be held from separation thereby.

Figure II is a vertical sectional view of our improved bolt, similar to the view shown in Figure I, but showing the detent collapsed.

Figure III is a vertical sectional view of a portion of the operating parts taken along the line III—III of Figure I.

Figure IV is a horizontal sectional view, showing the manner of mounting the detent, taken along the line IV—IV of Figure I.

Figure V is a vertical sectional view of a portion of the bolt, showing a modified form of detent.

In the drawing, similar reference characters refer to corresponding parts throughout the several views, and the sectional views are taken looking in the direction of the small arrows at the end of the section lines.

Referring to the numbered parts of the drawing, 10 and 11 indicate plates or members, which may be of any desired form, and which are adapted to be held in proper position relative to each other. As examples of members of this character, in connection with which our improved bolt may be found to be useful, are the axle and tongue connection between parts of a wagon structure, or between a vehicle and a trailer, or between a plurality of trailers; a connection between two tongues; or a connection between a tongue and a holding plate. The members 10 and 11 are provided with openings 12 and 13 respectively for the reception of the bolt.

The main portion of the bolt is constructed in the form of a hollow sleeve or guide member 14, provided with an exterior collar or ring 15, firmly secured thereto in any desired manner, near the upper end of the bolt. A shaft 16 movable longitudinally of the sleeve is mounted within the sleeve 14 and is capable of being reciprocated therein. The shaft 16 is provided with an opening 17 in the upper end thereof for a purpose which will be hereinafter described. The sleeve 14 is provided near its lower end with slots 18 and 19, preferably positioned at opposite points in the circumference of the sleeve. The slot 18 is of considerably greater length than the slot 19, and those portions of the sleeve at the upper ends of the slots are beveled as at 20.

A detent 21 is mounted within the slots, having one end pivoted within the slot 19 by means of the pin 21' passing through the end of the detent and the adjacent portions of the sleeve. The slidable member 16 mounted within the sleeve 14 is provided with a slot 23 in its lower end, the upper end of said slot being of such a form as to provide a beveled face 24. A pin 25 is mounted in the arms 23′ formed in the end of the movable member 16 by the slot, and the pin 25 passes through an oblong opening 26 formed in the detent, and the said cotter-pin passes through the slot 23 in the slidable member and the slot 18 formed in the sleeve. The slidable member is provided with a slot 27 intermediate its ends, within which is positioned a pin 28 mounted in opposite sides of the sleeve 14. A compression spring 29 lies within a groove 31 formed longitudinally in the slidable member 16, one end of the spring resting against the pin 28 and the other end of the spring resting against the bottom 32 of the groove 31.

In the modified form of detent shown in Figure V, the slot 19$^a$ is provided at its end with a squared shoulder 33 against which is adapted to rest a squared shoulder 34 of the detent 21$^a$, when the detent is in its extended position. In this form of detent the pivotal mounting of the pin on the sleeve is dispensed with, and the pin is pivotally mounted at 35 within the slot 23$^a$ formed in the end of the slidable member 16$^a$.

As will be seen from the foregoing description, the bolt may readily be inserted in openings 12 and 13 formed in plates or members 10 and 11 respectively, which it is desired to hold in proper operative relation with respect to each other, and the bolt will be held against excessive downward movement with respect to the upper plate or member by the ring 15, which forms a shoulder on the bolt, and which is adapted to rest against the upper surface of the upper plate or member 10. When the bolt is inserted in the openings in the members, the detent may be retracted by a pull upon the upper portion of the slidable member 16, or pressure upon the bolt, forcing it into the opening will serve to raise the end of the detent as the lower portion of the bolt passes through the openings 12 and 13.

If desired, a chain or cord may be attached to the upper end of the slidable member 16 through the opening 17 to provide a ready and convenient means for raising the slidable member. When pull is released upon the upper end of the slidable member 16, the tension of the coiled spring 29 acting between the pin 28 and the bottom 32 of the groove 31 will tend to force the slidable member 16 downwardly and thus bring the detent to the position shown in Figure I, where it is extended and serves to prevent removal of the bolt.

When it is desired to remove the bolt, a pull is exerted upon the upper end of the slidable member 16, thereby raising said member within the sleeve 14 against the tension of the spring 29 a sufficient distance, as limited by the end of the slot 27 to permit the cotter-pin pivoting upon the pin 21′, to be withdrawn within the slots 18, 19 and 23, formed in the sleeve and slidable member respectively.

The operation of the detent in the modified form shown in Figure V is similar to that which has been described. It will be seen that when the slidable member 16$^a$ is drawn upwardly against the tension of the spring, the detent will be turned upon its pivot point 35 by the engagement of the abutting shoulders 33 and 34 in such a manner as to withdraw that portion of the detent, which in its extended position is without the sleeve, into the slots 18$^a$, and 23$^a$, formed in the sleeve and slidable member respectively, in a manner similar to that in which the detent, as shown in Figures I and II, is withdrawn.

It will be seen from the above description that we have devised a simple and efficient form of holding bolt, which is of simple construction, capable of being readily inserted into place and readily and easily removed, and in which the positive action of the detent is insured at all times when the device is in position.

While we have shown and described in considerable detail a specific embodiment of our invention, it is to be understood that this showing and description is illustrative only and for the purpose of rendering our invention more clear, and that we do not regard the invention as limited to the details of construction illustrated or described, nor any of them, except in so far as we have included such limitation within the terms of the following claims, in which it is our intention to claim all novelty inherent in our invention broadly as well as specifically.

Having thus described our invention, what we claim as new and desire to secure by Letters Patent, is:

1. In a device of the class described, a sleeve, a slotted member slidably mounted in the sleeve, a pin carried by the sleeve and extending through the slot formed in said member, a spring co-operating with said pin and member for yieldably urging the member in one direction relative to the pin, a detent, and co-operating means carried by said sleeve and member for retracting the detent upon relative movement of the sleeve and member against the tension exerted by the spring.

2. In a device of the class described, a sleeve adapted to be inserted through an opening in a body, a member slidably mounted in said sleeve and provided with a slot intermediate its ends, a pin carried by the sleeve and passing through said slot, a spring enclosed within the sleeve and co-operating with said pin and member to resiliently oppose relative movement of the same in one direction, and means co-operating with the sleeve and member to normally prevent removal of the sleeve from the body.

3. In a device of the class described, a sleeve, a member slidably mounted in said sleeve and provided with a slot intermediate its ends, a pin having its ends carried by the sleeve, and passing through said slot for limiting relative movement of the sleeve and member, a spring carried by said member and engaging the pin to depress the member, a detent connected with said member, a portion of which being adapted to be forced beyond the confines of the sleeve upon relative movement of the sleeve and member in one direction by the spring.

4. In a device of the class described, a guide member provided with a slot at one end thereof, a member slidably mounted within said guide member and having a slot in one end adapted to register with a slot in the guide member, a detent pivotally mounted on the guide member and provided with an elongated slot, a pin mounted in the slot of the slidable member and movable in the slot of the detent to retract said detent within the guide member when the slidable member is operated in one direction and a spring housed within the slidable member and adapted to force the detent into operative position.

5. In a device of the class described, a guide member, a member slidable in said guide member and provided with a slot at one end, a pin secured in said slot, a slotted detent projecting through the guide member and operating in the slot of the slidable member, the pin being movable in the slotted detent to retract the detent within the guide member and a spring housed within the slidable member and adapted to force a portion of the detent outside the guide member.

6. In a device of the class described, a guide member, a member slidable in said guide member and provided with a horizontal slot and a vertical slot opening into said horizontal slot, a pin secured at its end in the guide member and passing through the horizontal slot, a spring housed in the vertical slot and a detent pivotally mounted on one of said members, said pin acting as a stop for the spring and for the slidable member, when the spring has forced the slidable member downward and the detent has moved to operative position.

In testimony whereof, we affix our signatures.

ALBERT EGBERT,
EDWARD HOLMES.